(12) United States Patent
Nathan et al.

(10) Patent No.: US 7,978,187 B2
(45) Date of Patent: Jul. 12, 2011

(54) CIRCUIT AND METHOD FOR DRIVING AN ARRAY OF LIGHT EMITTING PIXELS

(75) Inventors: Arokia Nathan, Waterloo (CA); Yuriy Vygranenko, Waterloo (CA); Shahin Jafarabadiashtiani, Waterloo (CA); Peyman Servati, Waterloo (CA)

(73) Assignee: Ignis Innovation Inc., Kitchener, Ontario (CA)

( * ) Notice: Subject to any disclaimer, the term of this patent is extended or adjusted under 35 U.S.C. 154(b) by 920 days.

(21) Appl. No.: 10/554,754

(22) PCT Filed: Jul. 23, 2004

(86) PCT No.: PCT/CA2004/001742
§ 371 (c)(1),
(2), (4) Date: Oct. 6, 2006

(87) PCT Pub. No.: WO2005/029456
PCT Pub. Date: Mar. 31, 2005

(65) Prior Publication Data
US 2007/0080908 A1    Apr. 12, 2007

(30) Foreign Application Priority Data

Sep. 23, 2003  (CA) .................................... 2443206
Jun. 29, 2004  (CA) .................................... 2472689

(51) Int. Cl.
*G09G 5/00* (2006.01)
(52) U.S. Cl. ......... 345/204; 345/205; 345/207; 345/211

(58) Field of Classification Search .............. 345/76–78, 345/81–84, 204, 205, 207, 211; 370/354; 347/236; 73/290
See application file for complete search history.

(56) References Cited

U.S. PATENT DOCUMENTS

| | | |
|---|---|---|
| 4,354,162 A | 10/1982 | Wright |
| 5,589,847 A | 12/1996 | Lewis |
| 5,670,973 A | 9/1997 | Bassetti et al. |
| 5,748,160 A | 5/1998 | Shieh et al. |
| 5,815,303 A | 9/1998 | Berlin |
| 6,097,360 A | 8/2000 | Holloman |
| 6,259,424 B1 | 7/2001 | Kurogane |
| 6,288,696 B1 | 9/2001 | Holloman |
| 6,320,325 B1 | 11/2001 | Cok et al. |

(Continued)

FOREIGN PATENT DOCUMENTS

CA      1294034     1/1992

(Continued)

OTHER PUBLICATIONS

Yi He et al., "Current-Source a-Si:H Thin Film Transistor Circuit for Active-Matrix Organic Light-Emitting Displays", IEEE Electron Device Letters, vol. 21, No. 12, Dec. 2000, pp. 590-592.

(Continued)

*Primary Examiner* — Prabodh M Dharia
(74) *Attorney, Agent, or Firm* — Nixon Peabody LLP

(57) ABSTRACT

A technique for driving a column of pixels that include light emitting elements. The technique incorporates feedback data provided from feedback data sources connected to the data line and to feedback line of the array, pixel driving circuit with feedback path. The technique can also include block of the reference elements for input signal corrections.

21 Claims, 10 Drawing Sheets

U.S. PATENT DOCUMENTS

| | | | |
|---|---|---|---|
| 6,414,661 | B1 | 7/2002 | Shen et al. |
| 6,580,657 | B2 | 6/2003 | Sanford et al. |
| 6,594,606 | B2 | 7/2003 | Everitt |
| 6,618,030 | B2 | 9/2003 | Kane et al. |
| 6,668,645 | B1 * | 12/2003 | Gilmour et al. ............ 73/290 R |
| 6,687,266 | B1 | 2/2004 | Ma et al. |
| 6,690,344 | B1 | 2/2004 | Takeuchi et al. |
| 6,693,388 | B2 | 2/2004 | Oomura |
| 6,720,942 | B2 * | 4/2004 | Lee et al. ...................... 345/82 |
| 6,738,035 | B1 | 5/2004 | Fan |
| 6,771,028 | B1 | 8/2004 | Winters |
| 6,777,712 | B2 | 8/2004 | Sanford et al. |
| 6,806,638 | B2 | 10/2004 | Lih et al. |
| 6,809,706 | B2 | 10/2004 | Shimoda |
| 6,909,419 | B2 | 6/2005 | Zavracky et al. |
| 6,937,215 | B2 | 8/2005 | Lo |
| 6,943,500 | B2 | 9/2005 | LeChevalier |
| 6,995,510 | B2 | 2/2006 | Murakami et al. |
| 6,995,519 | B2 | 2/2006 | Arnold et al. |
| 7,027,015 | B2 | 4/2006 | Booth, Jr. et al. |
| 7,027,078 | B2 * | 4/2006 | Reihl ........................... 347/236 |
| 7,034,793 | B2 | 4/2006 | Sekiya et al. |
| 7,064,733 | B2 * | 6/2006 | Cok et al. ....................... 345/76 |
| 7,106,285 | B2 | 9/2006 | Naugler |
| 7,274,363 | B2 | 9/2007 | Ishizuka et al. |
| 7,321,348 | B2 | 1/2008 | Cok et al. |
| 7,502,000 | B2 | 3/2009 | Yuki et al. |
| 7,535,449 | B2 | 5/2009 | Miyazawa |
| 7,554,512 | B2 | 6/2009 | Steer |
| 7,619,594 | B2 | 11/2009 | Hu |
| 7,619,597 | B2 | 11/2009 | Nathan et al. |
| 2002/0084463 | A1 | 7/2002 | Sanford et al. |
| 2002/0101172 | A1 | 8/2002 | Bu |
| 2002/0158823 | A1 | 10/2002 | Zavracky et al. |
| 2002/0186214 | A1 | 12/2002 | Siwinski |
| 2002/0190971 | A1 | 12/2002 | Nakamura et al. |
| 2002/0195967 | A1 | 12/2002 | Kim et al. |
| 2003/0020413 | A1 | 1/2003 | Oomura |
| 2003/0030603 | A1 * | 2/2003 | Shimoda ........................ 345/76 |
| 2003/0076048 | A1 | 4/2003 | Rutherford |
| 2003/0151569 | A1 * | 8/2003 | Lee et al. ........................ 345/84 |
| 2003/0179626 | A1 | 9/2003 | Sanford et al. |
| 2003/0230141 | A1 * | 12/2003 | Gilmour et al. ............ 73/290 R |
| 2004/0032382 | A1 * | 2/2004 | Cok et al. ........................ 345/82 |
| 2004/0066357 | A1 * | 4/2004 | Kawasaki ........................ 345/76 |
| 2004/0135749 | A1 | 7/2004 | Kondakov et al. |
| 2004/0183759 | A1 | 9/2004 | Stevenson et al. |
| 2004/0189627 | A1 * | 9/2004 | Shirasaki et al. ............ 345/204 |
| 2004/0257355 | A1 | 12/2004 | Naugler |
| 2005/0110420 | A1 | 5/2005 | Arnold et al. |
| 2005/0140610 | A1 * | 6/2005 | Smith et al. ..................... 345/77 |
| 2005/0145891 | A1 | 7/2005 | Abe |
| 2005/0156831 | A1 | 7/2005 | Yamazaki et al. |
| 2006/0038758 | A1 * | 2/2006 | Routley et al. ................. 345/81 |
| 2006/0232522 | A1 | 10/2006 | Roy et al. |
| 2007/0080908 | A1 | 4/2007 | Nathan et al. |
| 2007/0182671 | A1 | 8/2007 | Nathan et al. |

FOREIGN PATENT DOCUMENTS

| | | |
|---|---|---|
| CA | 2368386 | 9/1999 |
| CA | 2432530 | 7/2002 |
| CA | 2498136 | 3/2004 |
| CA | 2522396 | 11/2004 |
| CA | 2443206 | 3/2005 |
| CA | 2472671 | 12/2005 |
| CA | 2567076 | 1/2006 |
| EP | 1194013 A1 | 3/2002 |
| EP | 1335430 | 8/2003 |
| EP | 1 381 019 | 1/2004 |
| EP | 1 521 203 A2 | 4/2005 |
| JP | 10-254410 | 9/1998 |
| JP | 2002-278513 | 9/2002 |
| JP | 2003-076331 | 3/2003 |
| JP | 2003-308046 | 10/2003 |
| WO | 9948079 | 9/1999 |
| WO | 01/27910 A1 | 4/2001 |
| WO | 03/063124 | 3/2002 |
| WO | 03/034389 | 4/2003 |
| WO | 2004/003877 | 1/2004 |
| WO | 2004034364 A1 | 4/2004 |
| WO | 2005/022498 | 3/2005 |
| WO | 2005/055185 | 6/2005 |
| WO | 2006/063448 | 6/2006 |

OTHER PUBLICATIONS

Written Opinion corresponding to co-pending International Patent Application Serial No. PCT/CA2004/001742, Canadian Patent Office; dated Feb. 21, 2005; (5 pages).

International Search Report corresponding to co-pending International Patent Application Serial No. PCT/CA/2004/001742, Canadian Patent Office; dated Feb. 21, 2005; (2 pages).

European Search Report corresponding to co-pending European Patent Application Serial No. 04786662.9, European Patent Office; dated Feb. 8, 2007; (3 pages).

Alexander et al.: "Pixel circuits and drive schemes for glass and elastic AMOLED displays"; dated Jul. 2005 (9 pages).

Chaji et al.: "A low-power driving scheme for a-Si:H active-matrix organic light-emitting diode displays"; dated Jun. 2005 (4 pages).

Chaji et al.: "A low-power high-performance digital circuit for deep submicron technologies"; dated Jun. 2005 (4 pages).

Chaji et al.: "A novel a-Si:H AMOLED pixel circuit based on short-term stress stability of a-Si:H TFTs"; dated Oct. 2005 (3 pages).

Chaji et al.: "A Novel Driving Scheme and Pixel Circuit for Amoled Displays"; dated Jun. 2006 (4 pages).

Chaji et al.: "A novel driving scheme for high-resolution large-area a-Si:H AMOLED displays"; dated Aug. 2005 (4 pages).

Chaji et al.: "An Enhanced and Simplified Optical Feedback Pixel Circuit for AMOLED Displays"; dated Oct. 2006.

Chaji et al.: "Driving scheme for stable operation of 2-TFT a-Si Amoled pixel"; dated Apr. 2005 (2 pages).

Chaji et al.: "Dynamic-effect compensating technique for stable a-Si:H Amoled displays"; dated Aug. 2005 (4 pages).

Chaji et al.: "eUTDSP: a design study of a new VLIW-based DSP architecture"; dated May 2003 (4 pages).

Chaji et al.: "High Speed Low Power Adder Design With a New Logic Style: Pseudo Dynamic Logic (SDL)"; dated Oct. 2001 (4 pages).

Chaji et al.: "High-precision, fast current source for large-area current-programmed a-Si flat panels"; dated Sep. 2006 (4 pages).

Chaji et al.: "Low-Cost Stable a-Si:H AMOLED Display for Portable Applications"; dated Jun. 2006 (4 pages).

Chaji et al.: "Pseudo dynamic logic (SDL): a high-speed and low-power dynamic logic family"; dated 2002 (4 pages).

Chaji et al.: "Stable a-Si:H circuits based on short-term stress stability of amorphous silicon thin film transistors"; dated May 2006 (4 pages).

European Search Report for European Application No. EP 04 78 6662 dated Jan. 19, 2007.

Goh et al., "A New a-Si:H Thin-Film Transistor Pixel Circuit for Active-Matrix Organic Light-Emitting Diodes", IEEE Electron Device Letters, vol. 24, No. 9, Sep. 2003, pp. 583-585.

International Search Report for International Application No. PCT/CA2004/001742 dated Feb. 21, 2005.

Jafarabadiashtiani et al.: "A New Driving Method for a-Si AMOLED Displays Based on Voltage Feedback"; dated 2005 (4 pages).

Lee et al.: "Ambipolar Thin-Film Transistors Fabricated by PECVD Nanocrystalline Silicon"; dated 2006 (6 pages).

Matsueda y et al.: "35.1: 2.5-in. AMOLED with Integrated 6-bit Gamma Compensated Digital Data Driver"; dated May 2004.

Nathan et al., "Amorphous Silicon Thin Film Transistor Circuit Integration for Organic Led Displays on Glass and Plastic", IEEE Journal of Solid-State Circuits, vol. 39, No. 9, Sep. 2004, pp. 1477-1486.

Nathan et al.: "Backplane Requirements for Active Matrix Organic Light Emitting Diode Displays"; dated 2006 (16 pages).

Nathan et al.: "Driving schemes for a-Si and LTPS AMOLED displays"; dated Dec. 2005 (11 pages).
Nathan et al.: "Invited Paper: a -Si for AMOLED—Meeting the Performance and Cost Demands of Display Applications (Cell Phone to HDTV)"; dated 2006 (4 pages).
Philipp: "Charge transfer sensing" Sensor Review, vol. 19, No. 2, Dec. 31, 1999, 10 pages.
Rafati et al.: "Comparison of a 17 b multiplier in Dual-rail domino and in Dual-rail D L (D L) logic styles"; dated 2002 (4 pages).
Safavaian et al.: "Three-TFT image sensor for real-time digital X-ray imaging"; dated Feb. 2, 2006 (2 pages).

Safavian et al.: "3-TFT active pixel sensor with correlated double sampling readout circuit for real-time medical x-ray imaging"; dated Jun. 2006 (4 pages).
Safavian et al.: "Self-compensated a-Si:H detector with current-mode readout circuit for digital X-ray fluoroscopy"; dated Aug. 2005 (4 pages).
Safavian et al.: "TFT active image sensor with current-mode readout circuit for digital x-ray fluoroscopy [5969D-82]"; dated Sep. 2005 (9 pages).

* cited by examiner

CIRCUIT AND METHOD FOR DRIVING AN ARRAY OF LIGHT EMITTING PIXELS

FIELD OF INVENTION

The present invention generally relates to a light emitting device display techniques, and more particularly, to a technique for driving light emitting elements that uses a feedback architecture during programming to compensate for instability and non-uniformity of the pixels.

BACKGROUND OF THE INVENTION

Recently active-matrix organic light-emitting diode (OLED) displays have become more attractive due to advantages over conventional liquid crystal flat displays. These advantages include the ability to fabricate OLED displays at a relatively low cost and high efficiency. Further the displays do not require backlighting and provide a wide viewing angle.

An active-matrix organic light-emitting diode (AMOLED) display compromises an array of rows and columns of pixels, each having an OLED and some active devices such as thin film transistors. Since OLEDs are current driven devices the pixel circuit of an AMOLED should be capable of providing an accurate and constant drive current to achieve a consistent and uniform luminance.

As disclosed in U.S. Pat. NO. 5,748,160, a simple pixel circuit comprises two thin film transistors (TFTs) and an OLED. In this circuit, the OLED is connected to the drain terminal of a driving TFT and a gate terminal of the driving TFT is connected to a column line through a switching TFT. A storage capacitor connected between the gate terminal of the driving TFT and ground is used to maintain the voltage at the gate terminal of the driving TFT when the pixel circuit is disconnected from column line. For this circuit the current through OLED strongly depends on the characteristic parameters of the driving TFT. Since the characteristic parameters of a TFT, particularly, the threshold voltage under bias stress, vary by time, and such changes may differ from pixel to pixel, the induced image distortion may be unacceptably high.

One of the methods that has been employed to make the current driving circuit less sensitive to the shift in the threshold voltage is programming the pixel with current instead of voltage. In this method, the OLED current is less dependent on the voltage-current characteristics of driving transistors. Implementations of current programmed pixel circuits for OLEDs have been disclosed e.g. Yi HE et al., "Current Source a-Si:H Thin-Film Transistor Circuit for Active Matrix Organic Light-Emitting Displays", IEEE Electro Device Letters, Vol. 21, No. 12, p 590-592, December 2000).

A drawback of the current programming method is that it is slow, particularly for low programming current levels, due to the large line capacitance. As a result, voltage programming methods are desirable considering their speed. This is particularly true for large area TVs and displays.

Another method to make the drive current less sensitive to transistor parameters is to use current feedback. United States patent application 20020101172A1 provides a driving system with current feedback. An external current comparator compares the pixel current with a reference current and generates an appropriate signal to control the pixel current. One drawback of the disclosed method is that the control signal is a current, which can limit the programming speed. Another drawback of the method is that the anode and cathode electrode of each OLED have to be patterned, which creates reliability concerns in the currently used OLED fabrication process.

Luminance feedback is another method that has been used to stabilize OLED luminance. As described in U.S. patent application 20030151569 feedback readout circuits responsive to the feedback signal representing the light output of the OLED can be used to provide brightness control. A drawback of the disclosed method is that every pixel requires a photo-sensor that is optically coupled to the OLED. This results in integration issues. Another drawback is that the low level of the feedback signal generated by a photo-sensor may lead to the poor signal-noise ratio, thereby narrowing the dynamic range of the system.

SUMMARY OF THE INVENTION

The present invention provides several driving circuits having a feedback control-system architecture that can be used for driving a column of the light emitting devices and are suitable for use in AMOLED displays. In the present invention, a feedback voltage is generated by an on-pixel feedback circuit or element. This voltage is used to adjust the programming voltage of the pixel.

According to an aspect of the invention each pixel in the column is connected to the feedback-type control unit via signal line and feedback lines, and receives a scanning clock signal via select line connection terminal. The programming voltage applied to the pixel through the signal line sets the driving current through the light emitting element. The programming voltage can be accurately adjusted by an external control unit through the use of feedback voltage generated by the on-pixel feedback circuit. The feedback voltage is proportional to the driving current of the light emitting element and is used to set the programming voltage so as to achieve the desired driving current despite presence of any instability (shift in characteristics of transistors and light emitting element) and non-uniformity across pixels The column control unit may be connected to the block of reference elements formed on the display substrate in order to correct an error in the output current level caused by inaccuracy of the pixel components or temperature drift. The block of reference elements may also include a photo-sensor optically coupled to the light emitting element in order to provide a luminance feedback compensation for brightness variations induced by instability of organic material or temperature changes.

According to another aspect of the invention a pixel circuit for use in a display is provided. The display comprising a plurality of pixels with each pixel having a select line, a signal line, a feedback line. The pixel circuit comprising a light emitting element, a drive part for providing a drive current to the light emitting element, the drive part having a storage capacitor and a switch use transistor having a gate terminal connected to the select line, and a first terminal connected to the signal line, and a second terminal, and an on-pixel feedback element for generating a feedback voltage representing a drive current provided to the light emitting element, the feedback signal being provided to the feedback line.

According to another aspect of the invention a pixel circuit for use in a display is provided. The display comprising a plurality of pixels with each pixel having a first select line, a second select line, a signal line, a feedback line. The pixel circuit comprising a light emitting element, a drive part for providing a drive current to the light emitting element, the drive part comprising a storage capacitor, a switch use transistor having a gate terminal connected to the first select line, a first terminal connected to the signal line and a second terminal, a drive use transistor having a gate terminal connected to the second terminal of the switch use transistor, a first terminal and a second terminal connected to the light emitting element, and an on-pixel feedback circuit for generating a feedback voltage representing a drive current provided to the light emitting element. The feedback circuit comprising a resistor to connected between the second terminal of said drive use transistor and a potential, and a feedback transistor having a gate connected to the second select line, a first terminal connected to the first terminal of the drive use transistor and a second terminal connected to the feedback line.

According to another aspect of the invention a pixel circuit for use in a display is provided. The display comprising a plurality of pixels with each pixel having a select line, a signal line, a feedback line. The pixel circuit comprising a light emitting element, a drive part for providing a drive current to the light emitting element, the drive part comprising, a storage capacitor, a switch use transistor having a gate terminal connected to the select line, a first terminal connected to the signal line and a second terminal a drive use transistor having a gate terminal connected to the second terminal of the switch use transistor, a first terminal and a second terminal connected to the light emitting element, and an on-pixel feedback circuit for generating a feedback voltage representing a drive current provided to the light emitting element. The feedback circuit comprising a resistor connected between the second terminal of said drive use transistor and a potential, and a feedback transistor having a gate connected to the select line, a first terminal connected to the first terminal of the drive use transistor and a second terminal connected to the feedback line.

According to another aspect of the invention a display device is provided. The display device comprising a select line, signal line to which a voltage signal in accordance with both brightness and feedback information is supplied, a feedback line to which a feedback voltage signal in accordance with current level of drive current is supplied, a plurality of pixels forming an array of pixels, each pixel of the plurality formed on a substrate at an intersecting portion of said scanning line and said signal and feedback lines, each pixel comprising a light emitting element, a current driving circuit having a storage capacitor and a switch use transistor, and a feedback circuit to provide feedback signals representing a current output of said current driving circuit, a display column control circuit for receiving input signals, adjusting the input signals using a reference circuit formed on the substrate at each column, and modifying the input signals in response to the feedback signals from pixels in the column to produce a desired brightness level of said light emitting element in a selected pixel, and a selecting line drive circuit for successively activating selecting lines.

According to another aspect of the invention a method of driving a plurality of light emitting elements arranged in a column at a desired brightness is provided. The method comprising the steps of selecting one pixel of a plurality of pixels in the column, establishing the desired brightness of a reference light emitting element by adjusting a reference current flowing through the light emitting element in response to a photocurrent from a photo-sensor that is optically coupled with the reference light emitting element, converting the reference current into a corresponding voltage level, transmitting the voltage level to the selected pixel, converting the voltage level into a drive current and generating a feedback signal representing a drive current level, adjusting the voltage level in response to the feedback signal from the selected pixel to establish a drive current substantially equal to the reference current, storing the adjusted voltage level, and driving the light emitting element with the drive current in accordance with the adjusted voltage level to produce the desired brightness level in the pixel.

Advantages of the present invention include the ability to provide a stable current to the light emitting diode over time, thereby maintaining image quality. Moreover, the combination of the external current feedback for pixel programming and luminance feedback for data signal preprocessing provides brightness control and compensation despite instability and non-uniformity in pixels. The circuits occupy a small area and are voltage programmed with voltage feedback. The use of voltage for programming and feedback improves the programming speed, which is necessary for large area displays and TVs.

This summary of the invention does not necessarily describe all features of the invention.

BRIEF DESCRIPTION OF THE DRAWINGS

These and other features of the invention will become more apparent from the
following description in which reference is made to the appended drawings wherein.

DETAILED DESCRIPTION

The present invention encompasses a technique for driving of columns of pixels where each pixel comprises a light emitting element, in particular, an organic light emitting diode (OLED).

Figure 1:
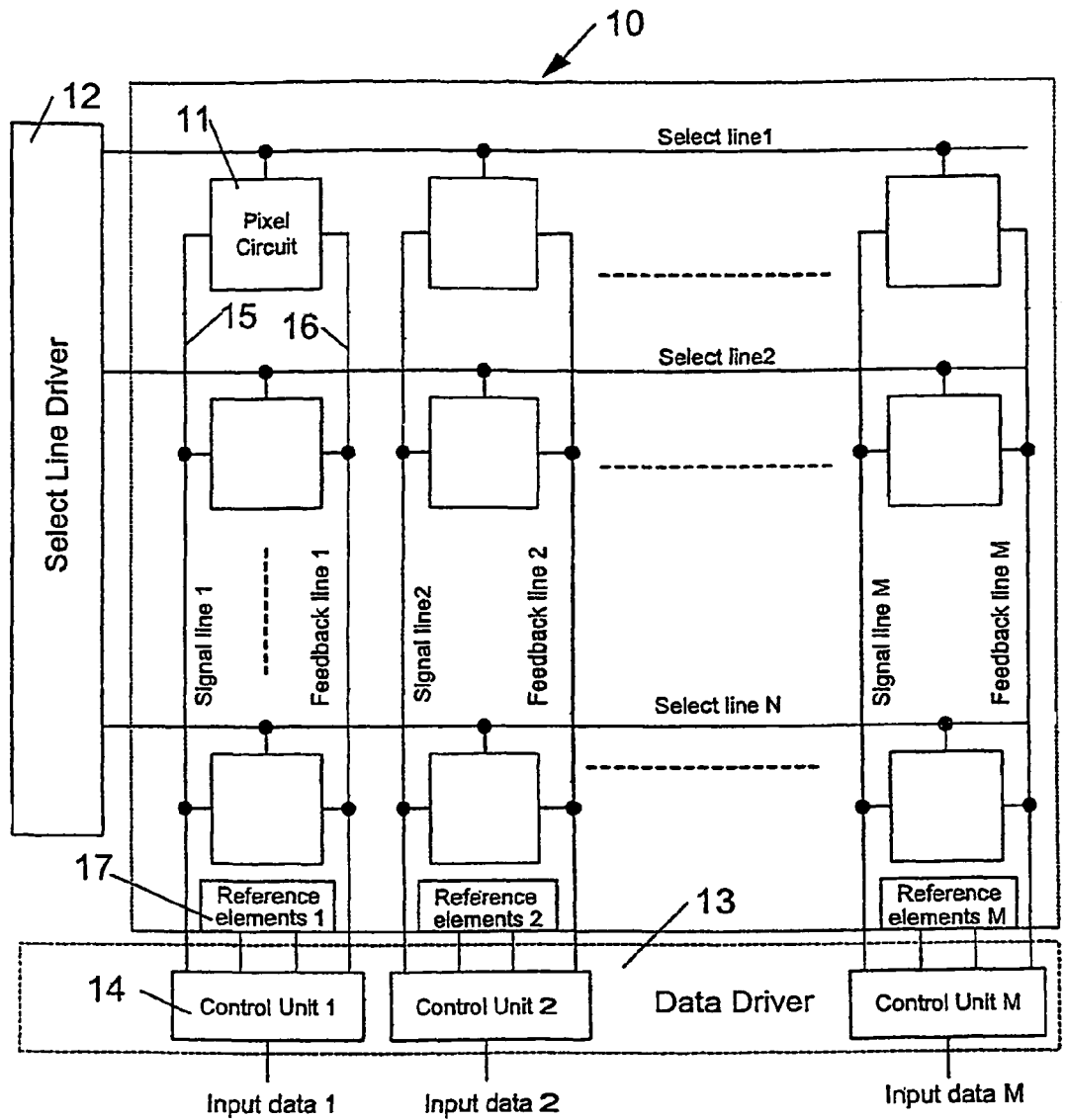
FIG. 1 is a block diagram of an example of the configuration of a display device with feedback control-system architecture according to an embodiment of the invention.

FIG. 1 presents a display device having a feedback control-system architecture 10 and an array of addressable pixels 11. The pixels 11 are controlled by a select line driver 12 and data driver 13. As shown in FIG. 1, a separate feedback control unit 14 is provided on each column line of the array. The feedback control unit 14 of a given column is connected to each pixel in the column via a signal line 15 and a feedback line 16. A block of reference elements 17, located on the display substrate, may also be provided. The block of the reference elements 17 includes some elements of the pixel circuit for input signal corrections and may also include a photo-sensor that is optically coupled to a light emitting element to implement a luminance feedback.

Figure 2:
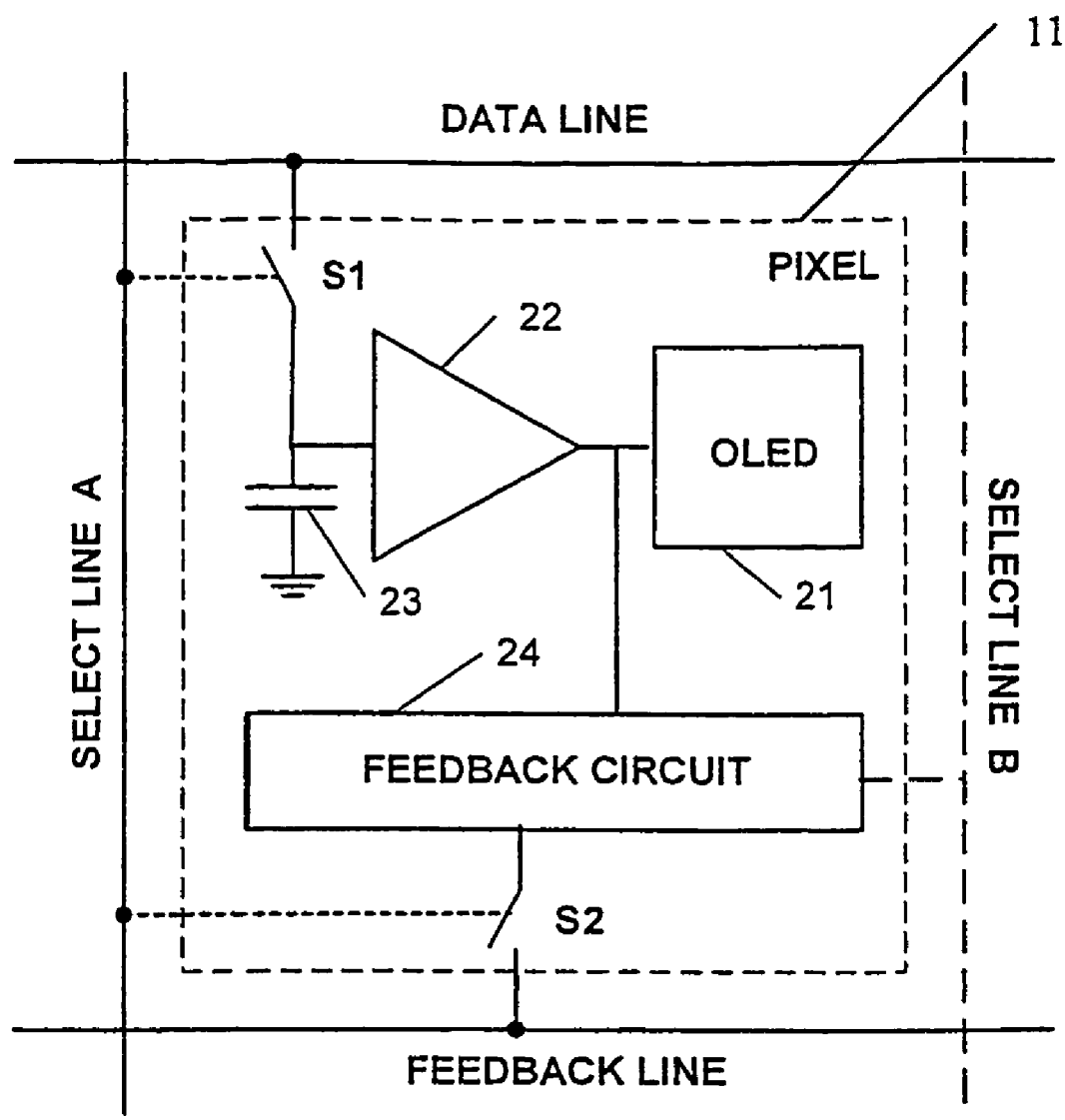
FIG. 2 is a block diagram of pixel architecture according to an embodiment of the invention.

The structure of a given pixel 11, according to an embodiment of the invention is shown in FIG. 2. As shown in FIG. 2, the pixel has an OLED 21, a current driving circuit 22, controlled by the stored voltage level using a storage capacitor 23, a feedback circuit 24, and switches S1 and S2. The switches S1 and S2 can be any suitable switching device, but are preferably an insulating gate type field effect transistor. The pixel 11 operates in writing and hold modes. In the writing mode, when select line(s) are activated, the switches S1 and S2 are turned on, and the current driving circuit 22 receives the signal voltage from control unit 14, while the on-pixel feedback circuit 24 feeds the voltage feedback signal. The driving current through the OLED 21 can thereby be accurately controlled through the use of negative feedback. In the hold mode, the switches SI and S2 are turned off and the driving circuit 22 provides the driving current having a current level in accordance with the voltage level to the storage capacitor 23.

Figure 3A:
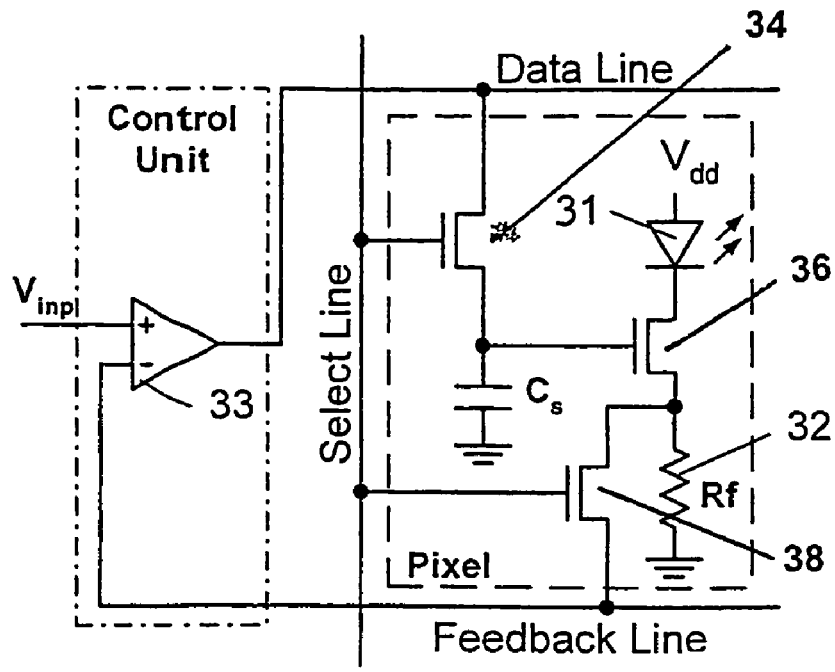
FIG. 3A is a circuit diagram of a pixel circuit and column control unit according to an embodiment of the invention.
Figure 3B:
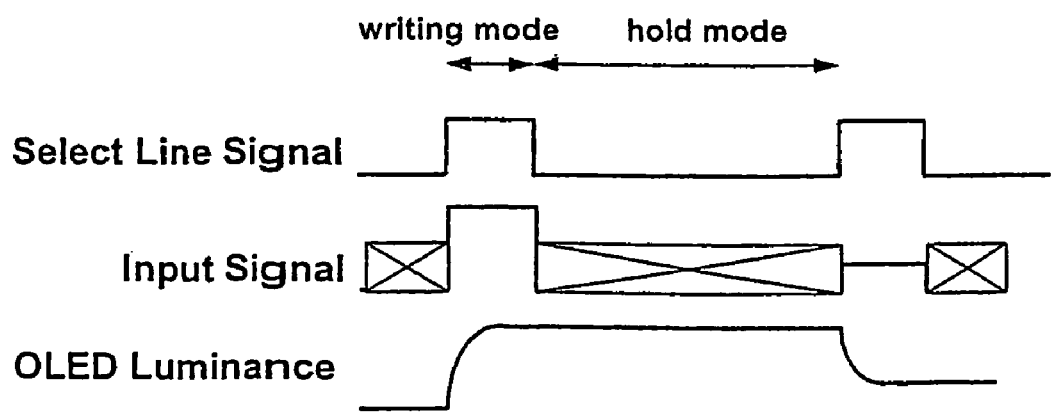
FIG. 3B depicts the corresponding waveforms for the circuit of FIG. 3A according to an embodiment of the invention.

FIG. 3A shows a pixel drive circuit according to an alternative embodiment and a circuit diagram of the control unit 14. Controlling signals are shown in FIG. 3B.

The pixel drive circuit comprises three transistors 34, 36 and 38, a resistor 32, a storage capacitor Cs and an OLED 31. The pixel drive circuit is connected to a select line, a feedback line, and a signal line. A power supply node having a positive potential Vdd and common ground are also shown.

Transistors 34, 36 and 38 can be fabricated using amorphous silicon, poly silicon, appropriate organic semiconductors and NMOS or CMOS technologies. The on-pixel feedback circuit is consisted of a thin film resistor 32 that can be fabricated with any appropriate material and technology, which provides sufficient stability. For instance, in amorphous silicon technology the resistor 32 can be fabricated using N+ amorphous silicon or N+ microcrystalline silicon.

The drain terminal of driving transistor 36 is connected to the cathode of OLED 31. The source terminal of transistor 36 is connected to resistor 32 and the gate terminal is connected to the signal line through transistor 34. Resistor 32 is connected between the source terminal of transistor 36 and the common ground.

Transistors 34 and 38 are driving switch and feedback switch transistors, respectively. The gate terminals of transistors 34 and 38 are connected to the select line. The source terminal of transistor 34 is connected to the signal line and the drain terminal is connected to the gate terminal of transistor 36. The source terminal of transistor 38 is connected to the feedback line and the drain terminal is connected to resistor 32. All OLEDs of the different pixels have a common anode electrode, connected to the voltage supply node (Vdd). Storage capacitor Cs is connected between the gate terminal of transistor 36 and common ground. It can be connected between gate and source terminals of transistor 36. For the latter, capacitor Cs can be implemented by the gate-source capacitance of transistor 36.

The external controlling unit 33 in its simplest form is a high-gain, low offset difference amplifier with a negative feedback connection.

During the writing mode, the select signal goes high, turning on transistors 34 and 38. As a result, the driving transistor 36, along with the external difference amplifier 33 and resistor 32 make a circuit with negative feedback. The difference in the voltage level between an input signal voltage and a voltage drop across the resistor 32 is amplified by the difference amplifier 33, adjusting the potential on the gate of transistor 36. After the initial transients the output current stabilizes and in the case of a high-gain feedback loop the current passing through the OLED 31 is:

$$I_{OLED} = \frac{Vinp}{Rf}. \quad (1)$$

During the hold mode, the select line goes low, so transistors 34 and 38 are turned off and the pixel is disconnected. Since the gate voltage of driving transistor 36 is stored in capacitor Cs, the drive current does not change during the hold mode.

Figure 4:
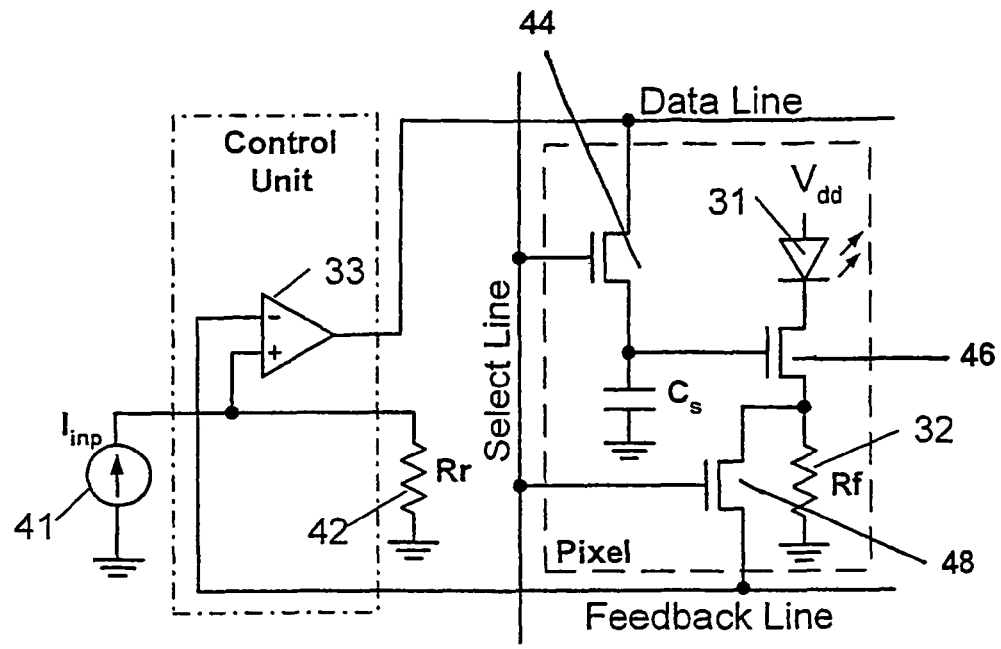
FIG. 4 is a circuit diagram of a modification of the embodiment of FIG: 3A.

In the configuration shown in FIG. 3A, the current of the pixel 31 depends on the absolute resistance of resistor 32, which is not desirable due to possible inherent inaccuracy and poor thermal stability of integrated resistors. FIG. 4 presents an architecture, according to another embodiment of the invention that addresses this by implementing a reference resistor 42 and an external data current source 41. The reference resistor 42 is made with the same material as integrated resistors and formed on the display substrate. This enhances the temperature stability of the circuit. The programmed level of the drive current for this circuit is:

$$I_{OLED} = Iinp \frac{Rr}{Rf}, \quad (2)$$

where Rr is the resistance of the reference resistor 42, and Rf is the resistance of the feedback resistor 32. The above equation indicates a considerable improvement in the accuracy of the programming current because of insensitivity of the resistance ratio to the temperature variations.

Figure 5:
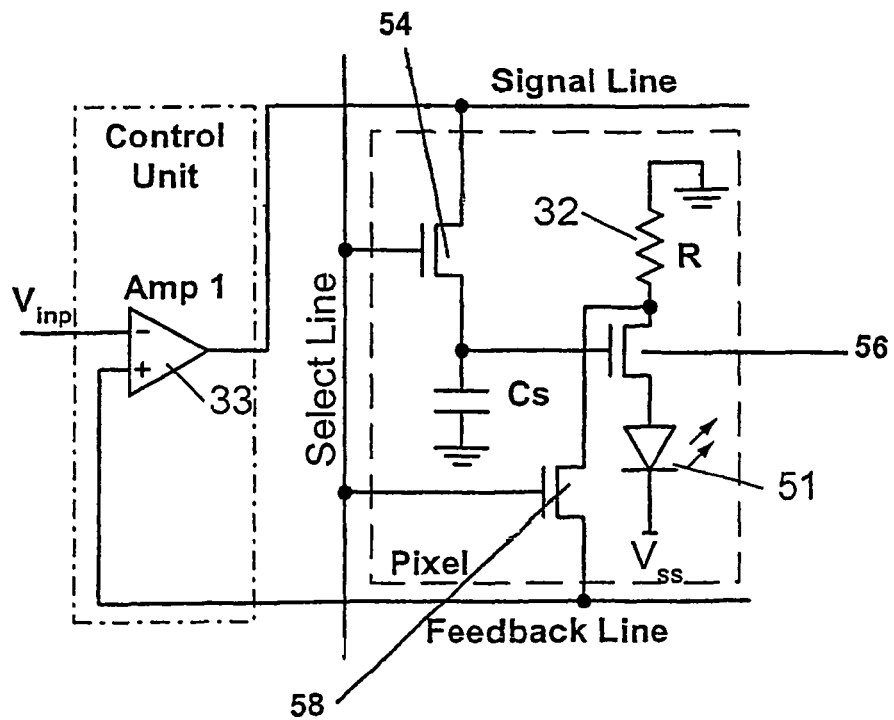
FIG. 5 is a schematic of a pixel circuit for a common cathode OLED configuration according to an embodiment of the invention.

A current pixel drive circuit according to another embodiment of the invention and a section of the column driver circuitry are shown in FIG. 5. The circuit is similar to the circuit of FIG. 3A however, in the circuit of FIG. 5, the cathode of OLED 51 is common and is connected to a negative power supply potential Vss. As a result, the cathode of the OLEDs is not patterned.

The anode of OLED 51 is connected to the source terminal of transistor 56. The feedback resistor 32 is connected between the drain terminal of transistor 56 and ground node. The voltage level of the select line during the writing mode should be high enough to guarantee that transistor 54 is in "on" state for the entire output current range. The feedback line in this configuration is connected to the non-inverting input of the difference amplifier 33 to provide a negative feedback.

FIG.'s 6A, 7 and 8 illustrate pixel drive circuit, according to other aspects of the invention wherein p-channel MOS transistors are used.

Figure 6A:
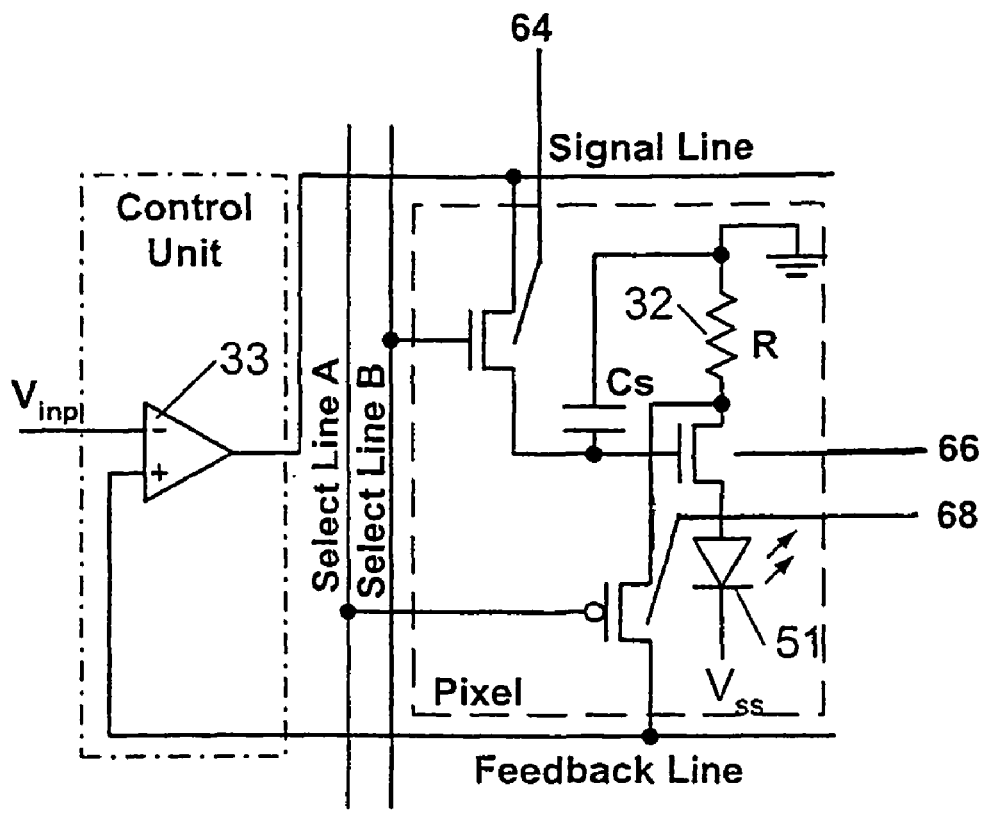
FIG. 6A is a circuit diagram of a column control unit and a pixel circuit having p-channel type transistors according to an embodiment of the invention.
Figure 6B:
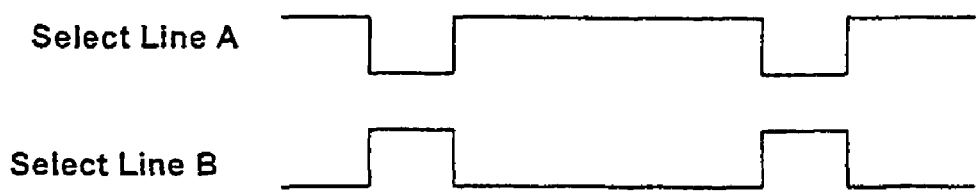
FIG. 6B depicts the corresponding waveforms for the circuit of FIG. 6A according to an embodiment of the invention.

FIG. 6A shows a pixel circuit, according to another embodiment of the invention. The feedback switch use transistor 68 is p-channel transistor. The circuit is similar to the circuit of FIG. 5, however the implementation of the PMOS transistor requires an additional select line. FIG. 6B shows corresponding waveforms for select line A and select line B. The advantage of this circuit over the circuit of FIG. 5 is the lower voltage swing for the select lines that is required.

Figure 7:
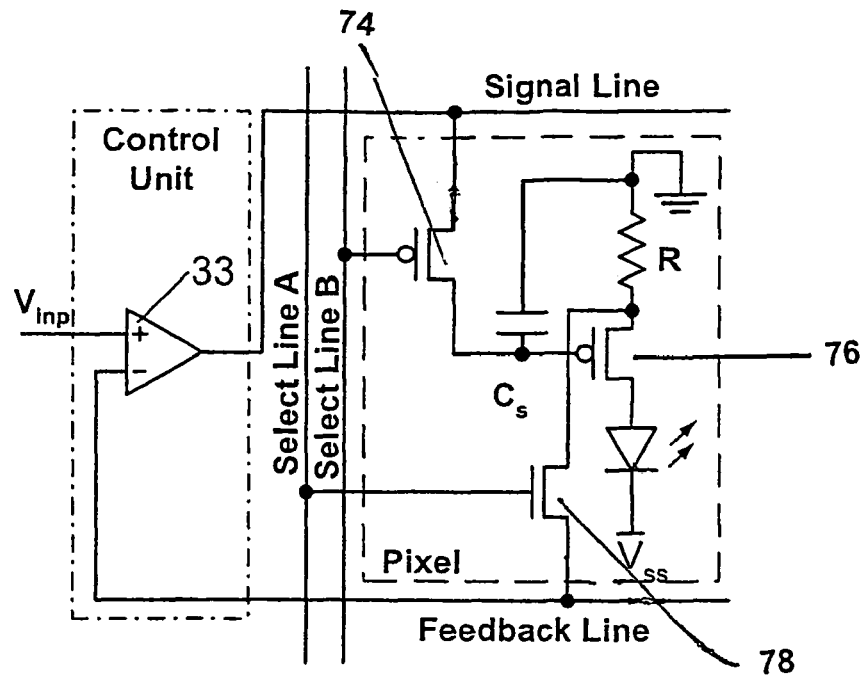
FIG. 7 is a circuit diagram of a column control unit and a pixel circuit with a p-channel type transistor switch according to an embodiment of the invention.

FIG. 7 shows a pixel circuit according to another embodiment of the invention. The transistors 76 and 74 are p-channel transistors and the transistor 78 is an n-channel transistor. As an embodiment of FIG. 7 this circuit also has two select lines marked as A and B having reduced voltage swing.

Figure 8:
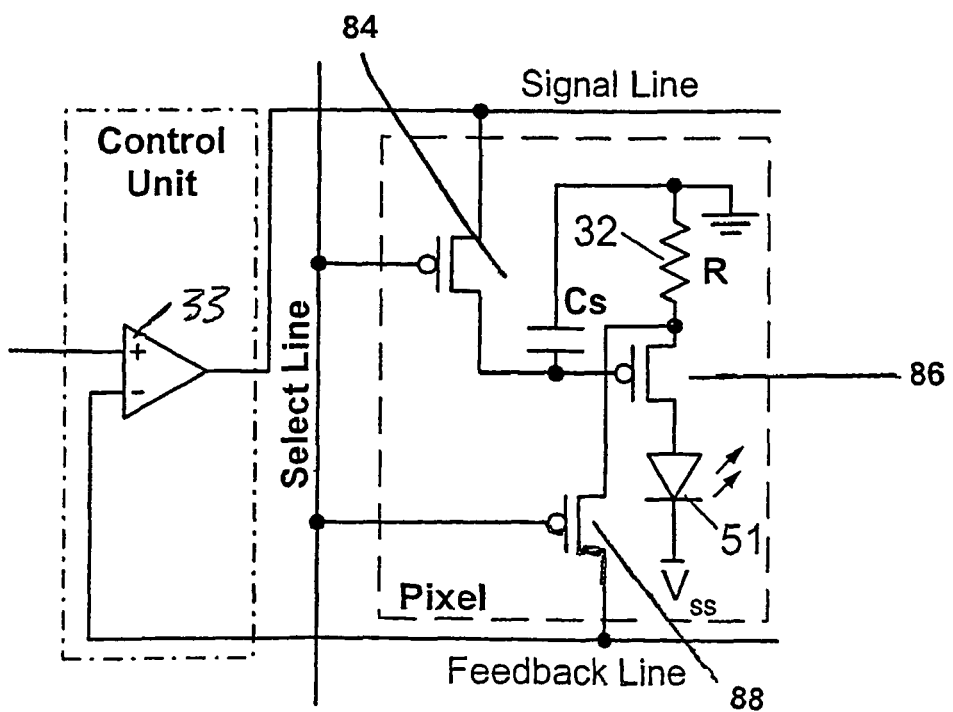
FIG. 8 is a circuit diagram of a column control unit and a pixel circuit having p-channel and n-channel type transistors according to an embodiment of the invention.

In the pixel circuit shown in FIG. 8, all of the transistors are p-channel transistors. Here the anode of the OLED 51 is connected to the drain terminal of the transistor 76 and the common cathode electrode of the OLED 51 is connected to the negative power supply potential Vss.

Figure 9:
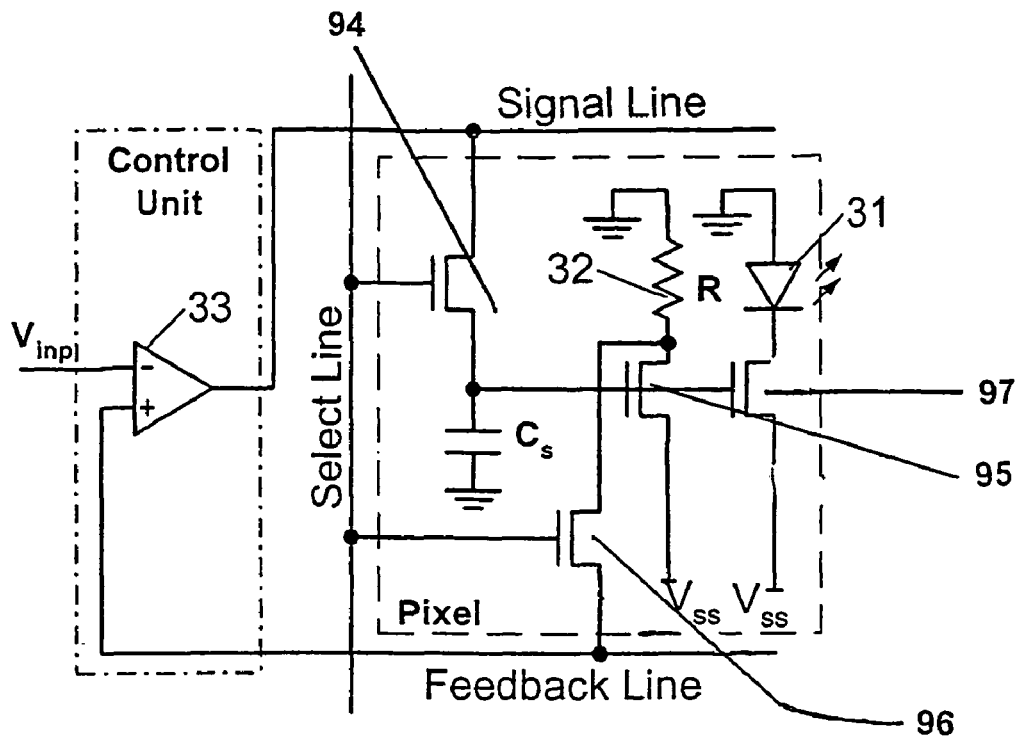
FIG. 9 is a circuit diagram of a column control unit and a pixel circuit with a current mirror as current driving circuit according to an embodiment of the invention.

FIG.'s. 9 and 10 show configurations of the pixel circuits according to alternative embodiments of the invention. In these pixel circuits, the current driving circuitry is based on a current mirror architecture, i.e. transistors 96 and 97 and 108 and 110. The current level of the signal current and the current level of the drive current are proportional. In the circuit of FIG. 9, all transistors are n-channel 10 transistors and in the circuit of FIG. 10 all transistors are p-channel transistors.

Figure 10:
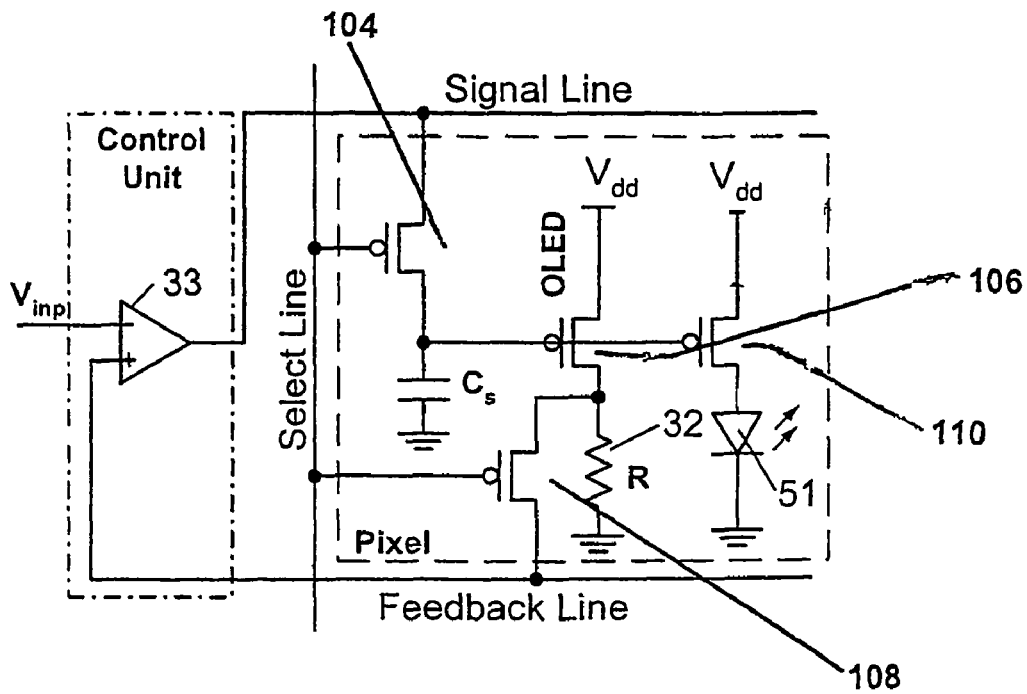
FIG. 10 is a circuit diagram of a modification of the embodiment of FIG. 9.

In FIG. 10, the feedback resistor 32 is connected between the drain terminal of transistor 106 and common ground. The gate terminals of the transistors 106 and 110 are connected. In the circuit of FIG. 9, the cathode electrode of OLED 31 is connected to the drain terminal of transistor 97, the anode is common and the transistor 97 is the driving transistor and is connected to OLED 31. In the circuit of FIG. 10, the cathode of the OLED 51 is common and the anode is connected to the drain terminal of the transistor 110.

During writing mode, the transistors 104 and 108 are in an "on" state, thus the transistor 106 along with feedback resistor 32 and external control unit (the difference amplifier 33) form a feedback loop. The transistor 110 does not directly take part in the feedback loop, but since, the transistors 110 and 106 have same gate-source voltage, the current of the transistor 110 is proportional to the current of the transistor 106. The ratio of current through transistors 110 to 106 is determined by the aspect ratios of these transistors. In these circuits, the feedback resistor 32 and the OLED 31 of FIG. 9 and 51 of FIG. 10, are not in the same current path thus a higher lifetime is expected.

Figure 11:
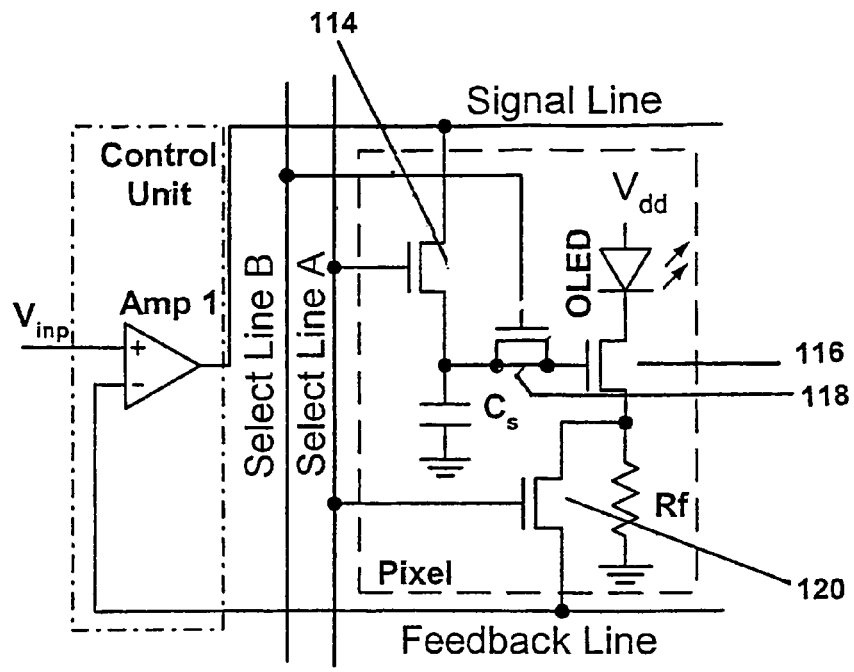
FIG. 11 is a circuit diagram of a modification of the embodiment of FIG. 3.

Several methods have been used to reduce the charge injection and clock feed-through effects in integrated circuits. As the simplest approach, a dummy transistor that is driven by the inverse signal of the select line connected to the gate of driving 0 transistor can reduce both charge injection and clock feed-through errors caused by the driving switch. The drain and source terminals of the dummy transistor are connected to the gate of the driving transistor. FIG. 11 shows an example of such modification for the embodiment of FIG. 3. The width of dummy trasistor 118 is half of the width of driving transistor 116. It will be apparent to one skilled in the art that the width of the dummy transistor 118 can be any appropriate size.

Figure 12:
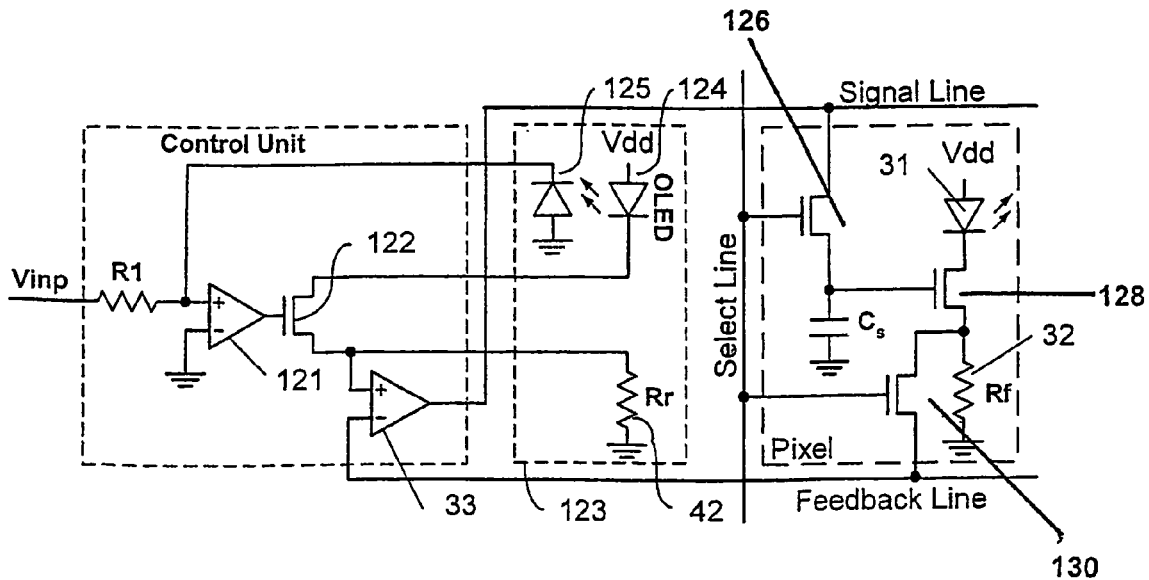
FIG. 12 is a circuit diagram of a pixel circuit, column control unit and a reference cell with implemented luminance feedback according to an embodiment of the invention.

FIG. 12 is a schematic circuit diagram of another embodiment of a pixel circuit, column control unit and a reference cell according to the present invention.

Here, the implemented luminance feedback improves the linearity of the video signal—light output characteristics, and also provides a compensation for brightness instability caused by instability of the organic material, ageing, temperature changes, or other environment stresses. The compensating circuit with luminance feedback includes a resistor R1, a difference amplifier 121, and a NMOS transistor 122, which are parts of the control unit, and the elements of the reference cell 123 including an OLED 124, and photodiode 125. The photodiode 125 is optically coupled to the reference OLED 124 to form a feedback current signal in response to emitted light.

The circuit is balanced when the input current passing through the resistor R1 is equal to a feedback current generated by the photodiode 125. The current flowing through OLED 124 via transistor 122 and resistor 42 is an input signal for next stage of the device, which is the same as the embodiment of FIG. 4.

Figure 13:
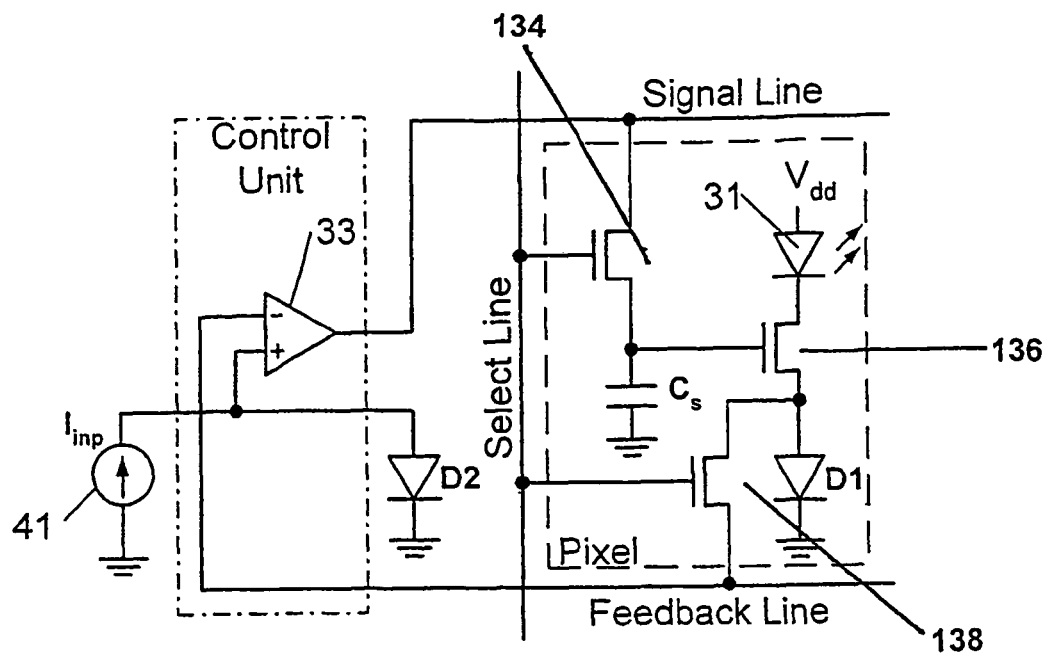
FIG. 13 is a circuit diagram of a pixel circuit and column control unit with a reference diode according to an embodiment of the invention.

FIG. 13 is a schematic diagram of an alternative embodiment of the embodiment of FIG. 4. In this embodiment, diodes D1 and D2 are used in place of feedback resistor R1 and reference resistor R2 of FIG. 3, respectively. As circuit functionality with reasonably low error in the programmed current level requires a good match between the reference diode and pixel diodes, the fabrication technology must be efficient for fabrication of the diode array with reproducible forward current-voltage characteristics.

Figure 14:
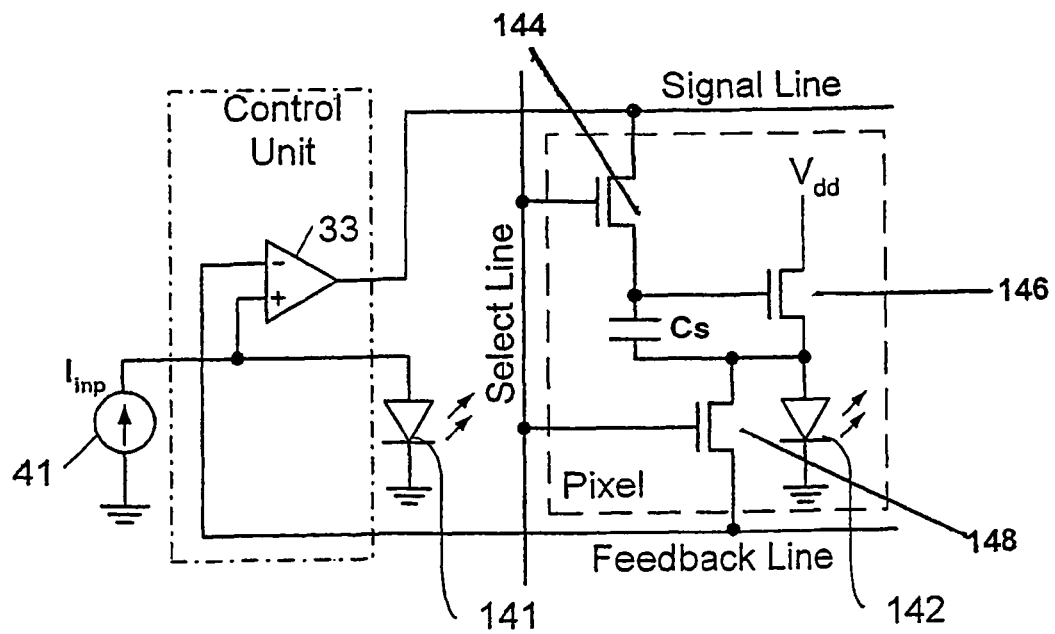
FIG. 14 is a circuit diagram of a pixel circuit, column control unit with a reference OLED according to an embodiment of the invention.
Figure 15:
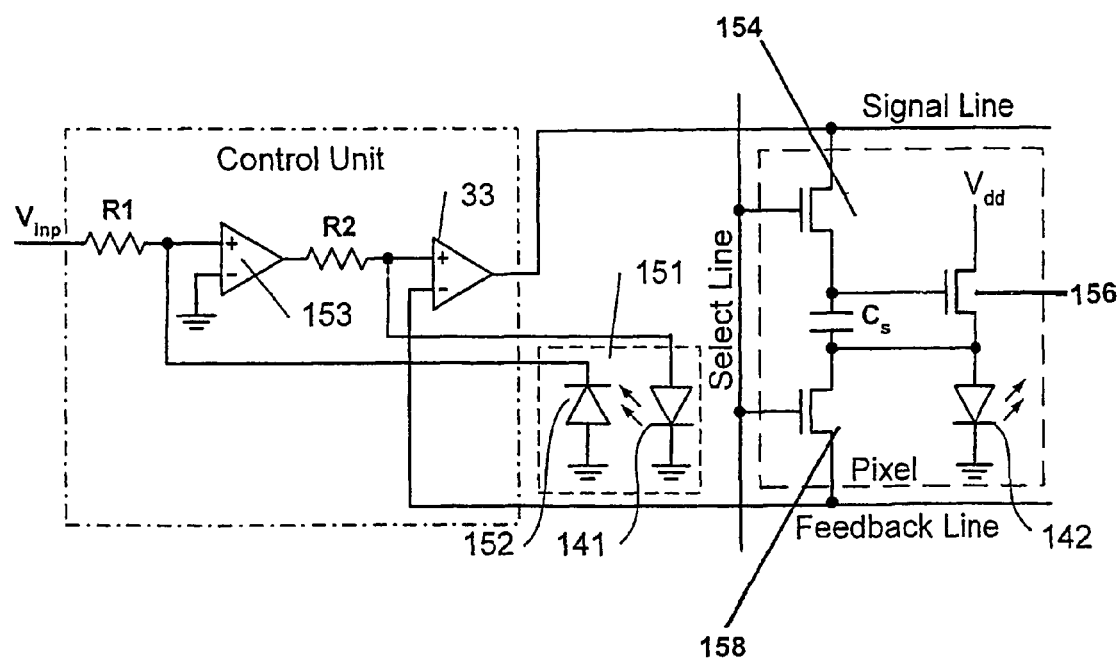
FIG. 15 is a circuit diagram of a modification of the embodiment of FIG. 14.

A schematic diagram of a circuit according to another embodiment of the invention is shown in FIG. 14. This circuit implements a common cathode OLED array configurations. In the writing mode, the input current from an external current data source 41 creates a voltage drop across a reference OLED 141. A difference amplifier 33 in negative feedback connection is designed to hold the same voltage level on a pixel OLED 142. During the hold mode, the current with a programmed current level flows through both the transistor 146 and the OLED 142 due to the voltage stored across the capacitor Cs.

Although the exemplary embodiments of the present invention are described in conjunctions with OLEDs, it is also contemplated other similar display elements such as a light emitting diode (LED) could be used in other embodiments.

The present invention has been described with regard to one or more embodiments. However, it will be apparent to persons skilled in the art that a number of variations and modifications can be made without departing from the scope of the invention as defined in the claims.

What is claimed is:

1. A pixel circuit for use in a display, the display comprising a plurality of pixels with each pixel having a select line, a signal line, a feedback line, each of the pixels comprising:
   a light emitting element;
   a drive part for providing a drive current to the light emitting element, the drive part having
      a storage capacitor,
      a switch use transistor having a gate terminal connected to the select line, and a first terminal connected to the signal line, and a second terminal connected to the storage capacitor,
      a drive use transistor having a gate terminal connected to the second terminal of the switch use transistor, a first terminal connected to the light emitting element, and a second terminal, and
      a feedback switch having a first terminal connected to the drive use transistor, and a second terminal connected to the feedback line; and
   an on-pixel feedback conductive path between the second terminal of the drive use transistor and a reference potential for generating a feedback voltage representing a drive current provided to the light emitting element, the feedback voltage being provided to the feedback line via the feedback switch.

2. The pixel circuit according to claim 1, wherein each pixel further includes a feedback circuit that provides the on-pixel feedback conductive path, the feedback circuit including a resistor, a diode, or the light emitting element connected between the drive use transistor and the reference potential, the reference potential being ground.

3. The pixel circuit according to claim 2, wherein the feedback circuit comprises a resistor connected between the second terminal of said drive use transistor and a potential providing the feedback voltage at a level proportional to the drive current.

4. The pixel circuit according to claim 1, wherein the storage capacitor is connected to ground or to the first terminal of the feedback switch.

5. The pixel circuit according to claim 1, wherein the drive part further comprises:
a second drive use transistor having a gate terminal, a first terminal and a second terminal,
the feedback switch and the drive use transistor arranged to form a current mirror structure,
the gate terminals of the drive use transistor and the second drive use transistor connected to the second terminal of the switch use transistor,
the first terminal of the feedback switch and the first terminal of the second drive use transistor connected to a power supply node.

6. The pixel circuit according to claim 1, wherein each of the pixels further comprises
a resistor connected to the second terminal of the drive use transistor, wherein the reference potential is ground.

7. The pixel circuit according to claim 1, wherein the drive part further comprises
second drive use transistor having a gate terminal, a first terminal and a second terminal,
the drive use transistor and the second drive use transistor being arranged to form a current mirror structure,
the gate terminals of the drive use transistor and the second drive use transistor being connected to the second terminal of the switch use transistor,
the second terminal of the drive use transistor is connected to ground.

8. The pixel circuit according to claim 1, wherein the on-pixel feedback conductive path includes the light emitting element connected between the second terminal of the drive use transistor and the reference potential.

9. The pixel circuit according to claim 1, wherein each of the pixels further comprise a diode connected between the second terminal of said drive use transistor and a predetermined potential to provide the feedback voltage and said feedback switch is an insulating gate type field effect transistor having a gate connected to said select line.

10. The pixel circuit according to claim 1, wherein each pixel further includes a second select line, and wherein the feedback switch has a gate terminal connected to the second select line.

11. The pixel circuit according to claim 1, wherein said light emitting element is an organic light emitting diode.

12. The pixel circuits according to claim 1, wherein the feedback switch is a transistor, and wherein the transistors are insulating gate type field effect transistors that comprise n-channel and p-channel type transistors.

13. A pixel circuit for use in a display having a plurality of pixels connected to a first select line, a second select line, a signal line, and a feedback line, each of the pixel circuit comprising:
a light emitting element;
a drive part for providing a drive current to the light emitting element, the drive part comprising:
a storage capacitor;
a switch use transistor having a gate terminal connected to the first select line, a first terminal connected to the signal line and a second terminal;
a drive use transistor having a gate terminal connected to the second terminal of the switch use transistor, a first terminal and a second terminal connected to the light emitting element;
an on-pixel feedback circuit for generating a feedback voltage representing a drive current provided to the light emitting element, the feedback circuit comprising a resistor connected between the second terminal of said drive use transistor and a potential; and
a feedback transistor having a gate connected to the second select line, a first terminal connected to the drive use transistor, and a second terminal connected to the feedback line.

14. The pixel circuit according to claim 13 wherein the switch use and drive use transistors are n-type, and the feedback transistor is p-type.

15. The pixel circuit according to claim 13 wherein the switch use and drive use transistors are p-type, and the feedback transistor is n-type.

16. A pixel circuit for use in a display, the display comprising a plurality of pixels each pixel connected to a select line, a signal line, and a feedback line, each of the pixels comprising:
a light emitting element;
a drive part for providing a drive current to the light emitting element, the drive part including:
a storage capacitor;
a switch use transistor having a gate terminal connected to the select line, a first terminal connected to the signal line and a second terminal;
a drive use transistor having a gate terminal connected to the second terminal of the switch use transistor, a first terminal and a second terminal connected to the light emitting element;
an on-pixel feedback circuit for generating a feedback voltage representing a drive current provided to the light emitting element, the feedback circuit comprising a resistor connected between the first terminal of said drive use transistor and a potential; and
a feedback transistor having a gate connected to the select line, a first terminal connected to the first terminal of the drive use transistor and a second terminal connected to the feedback line.

17. The pixel circuit according to claim 16, wherein the switch use transistor, drive use transistor, and the feedback transistor are p-type, and wherein the storage capacitor is connected between the gate of the drive use transistor and the potential.

18. A display device, comprising:
a select line;
a signal line to which a voltage signal in accordance with both brightness and feedback information is supplied;
a feedback line to which a feedback voltage signal in accordance with a current level of drive current is supplied;
a plurality of pixels forming an array of pixels, each of the pixels formed on a substrate at an intersecting portion of said select line and said signal and feedback lines, each of the pixels comprising:
- a light emitting element;
- a current driving circuit having a storage capacitor and a switch use transistor; and
- a feedback circuit to provide feedback signals representing a current output of said current driving circuit;

a display column control circuit for receiving input signals, adjusting the input signals using a reference circuit formed on the substrate at each column, and modifying the input signals in response to the feedback signals from pixels in the column to produce a desired brightness level of said light emitting element in a selected pixel; and a selecting line drive circuit for successively activating selecting lines.

19. The display device claimed in claim 18, wherein said feedback circuit includes a resistor to provide the feedback signal in form of a voltage level proportional to the drive current, and said reference circuit includes a reference resistor made from the same material as said resistor.

20. The display device claimed in claim 18,
wherein said reference circuit includes a photo-sensor optically coupled to a reference light emitting element for brightness control, and
said display column control circuit includes a compensating part to compare a generated photocurrent level with an input current level and to adjust a current through said reference light emitting element to achieve a desired brightness level.

21. A method of driving a plurality of light emitting elements arranged in a column at a desired brightness, comprising:
- selecting one pixel of a plurality of pixels in the column via a select line, each of the pixels including a light emitting element and a current driving circuit having a storage capacitor and a switch use transistor;
- establishing the desired brightness of a reference light emitting element by comparing a generated photocurrent level from a photo-sensor that is optically coupled with the reference light emitting element with an input current level and adjusting a reference current flowing through the reference light emitting element;
- converting the reference current into a corresponding voltage level;
- transmitting the voltage level to the selected pixel;
- converting the voltage level into a drive current and generating a feedback voltage signal representing a drive current level via a feedback circuit of the selected pixel;
- adjusting the voltage level in response to the feedback voltage signal from the selected pixel to establish a drive current substantially equal to the reference current;
- storing the adjusted voltage level; and
- driving the light emitting element of the selected pixel with the drive current in accordance with the adjusted voltage level to produce the desired brightness level in the selected pixel.

* * * * *

UNITED STATES PATENT AND TRADEMARK OFFICE
CERTIFICATE OF CORRECTION

PATENT NO. : 7,978,187 B2  Page 1 of 1
APPLICATION NO. : 10/554754
DATED : July 12, 2011
INVENTOR(S) : Arokia Nathan et al.

It is certified that error appears in the above-identified patent and that said Letters Patent is hereby corrected as shown below:

On the title page item 22 PCT Filed: Replace July 23, 2004 *with* --- September 23, 2004

Signed and Sealed this
Twentieth Day of December, 2011

David J. Kappos
*Director of the United States Patent and Trademark Office*